US012792193B2

(12) United States Patent
Ikebe

(10) Patent No.: US 12,792,193 B2
(45) Date of Patent: Nov. 10, 2026

(54) INFORMATION PROCESSING APPARATUS, INFORMATION PROCESSING SYSTEM, INFORMATION PROCESSING METHOD, AND STORAGE MEDIUM FOR GENERATING VIRTUAL SPACE AND A VIRTUAL OBJECT

(71) Applicant: CANON KABUSHIKI KAISHA, Tokyo (JP)

(72) Inventor: Norihiro Ikebe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 18/499,493

(22) Filed: Nov. 1, 2023

(65) Prior Publication Data

US 2024/0201822 A1 Jun. 20, 2024

(30) Foreign Application Priority Data

Dec. 16, 2022 (JP) ................................. 2022-200868

(51) Int. Cl.

| | |
|---|---|
| ***G06F 3/04815*** | (2022.01) |
| ***G06F 3/01*** | (2006.01) |
| ***G06Q 30/0601*** | (2023.01) |
| ***G06T 19/00*** | (2011.01) |

(52) U.S. Cl.

CPC .......... *G06F 3/04815* (2013.01); *G06F 3/011* (2013.01); *G06Q 30/0643* (2013.01); *G06T 19/00* (2013.01); *G06Q 30/0623* (2013.01)

(58) Field of Classification Search

CPC . G06F 3/04815; G06F 3/011; G06Q 30/0643; G06Q 30/0623; G06T 19/00

See application file for complete search history.

(56) References Cited

U.S. PATENT DOCUMENTS

2009/0138376 A1* 5/2009 Smyers .............. G06Q 30/0623 705/26.1
2010/0198653 A1* 8/2010 Bromenshenkel ..... G06Q 30/06 715/757
2014/0282278 A1* 9/2014 Anderson ............... G06F 3/017 715/863
2018/0121997 A1* 5/2018 O'Brien ............. G06Q 30/0643
2019/0272139 A1* 9/2019 Todasco ............. G06Q 20/3224
2020/0117336 A1* 4/2020 Mani ..................... F25B 49/005
2020/0342682 A1* 10/2020 Wang ................... G02B 27/017

(Continued)

FOREIGN PATENT DOCUMENTS

JP 2022-047989 A 3/2022
JP 2022070862 A 5/2022

OTHER PUBLICATIONS

Notice of Reasons for Refusal issued by the Japanese Patent Office on Sep. 8, 2026 in corresponding JP Patent Application No. 2022-200868, with English translation.

*Primary Examiner* — William A Beutel

(74) *Attorney, Agent, or Firm* — Carter, DeLuca & Farrell LLP

(57) ABSTRACT

An information processing apparatus for generating virtual space and a virtual object includes a memory storing instructions, and a processor configured to execute the instructions to display the virtual object in the virtual space, and execute a function of the virtual object in the virtual space based on function information about the virtual object acquired from the memory.

9 Claims, 9 Drawing Sheets

(56) References Cited

U.S. PATENT DOCUMENTS

| | | | | |
|---|---|---|---|---|
| 2021/0004137 A1* | 1/2021 | Oser | G06Q 30/0601 | |
| 2023/0196450 A1* | 6/2023 | Moyal | G06Q 30/0631 | 705/26.7 |

* cited by examiner

PRODUCT INFORMATION DATABASE

CAMERA INFORMATION DATABASE

| PRODUCT NAME | ○○○ | △△△ | ... |
|---|---|---|---|
| WIDTH×HEIGHT ×DEPTH | W×H×D | W×H×D | |
| SLOW&FAST MOTIONS | 5.9K60P 2K120P | 4K120P 2K180P | |
| OneshotAF | ○ | ○ | |
| LENS MOUNT | A | B | |
| ... | | | |

LENS INFORMATION DATABASE

| PRODUCT NAME | □□□ | ××× | ▲▲▲ | ... |
|---|---|---|---|---|
| WIDTH×HEIGHT ×DEPTH | W×H×D | W×H×D | W×H×D | |
| SHORTEST IMAGING DISTANCE | 0.45m | 4.3m | 0.3m | |
| ANGLE OF VIEW | 84~23.2° | 2.05° | 46° | |
| IMAGE STABILIZATION | INCLUDED | INCLUDED | - | |
| ... | | | | |

ACCESSORY INFORMATION DATABASE

| PRODUCT NAME | ×× MOUNT | ●● REMOTE SW | ... |
|---|---|---|---|
| WIDTH×HEIGHT ×DEPTH | W×H×D | W×H×D | |
| FUNCTION | MOUNT CONNECTABLE BETWEEN A AND B | ·REMOTE IMAGEABLE ·IMAGE STABILIZATION | |

FIG. 3

INFORMATION PROCESSING APPARATUS, INFORMATION PROCESSING SYSTEM, INFORMATION PROCESSING METHOD, AND STORAGE MEDIUM FOR GENERATING VIRTUAL SPACE AND A VIRTUAL OBJECT

BACKGROUND

Technical Field

One of the aspects of the embodiments relates to an information processing apparatus, an information processing system, an information processing method, and a storage medium.

Description of Related Art

Technologies that utilize virtual space to train users to operate equipment have recently been known. A model (avatar) to replace the user himself and a model (object) of virtual equipment used for the training are placed in the virtual space. Moving the avatar and model in the virtual space in accordance with the user movements can provide easy training in an environment that would be difficult to prepare for in real life due to constraints such as cost and safety. Japanese Patent Laid-Open No. 2022-47989 discloses a technology for reproducing a sterile room as the virtual space in the medical field.

Recently, in order to provide users with a more immersive virtual world, manufacturers of actual products sell officially certified three-dimensional data (actual product information) and display it as an object in the virtual space.

In a case where the object is displayed in the virtual space such as that disclosed in Japanese Patent Laid-open No. 2022-47989, the functions that can be executed with the object depend on the settings of the application that displays the virtual space. Thus, in a case where an actual product is displayed, user operations and function execution that are unavailable with the actual product may be available depending on the settings of the application. In this case, the user's immersion sense in the virtual space deteriorates.

SUMMARY

An information processing apparatus according to one aspect of the embodiment for generating virtual space and a virtual object includes a memory storing instructions, and a processor configured to execute the instructions to display the virtual object in the virtual space, and execute a function of the virtual object in the virtual space based on function information about the virtual object acquired from the memory. An information processing apparatus according to another aspect of the embodiment for generating virtual space includes a memory storing instructions; and a processor configured to execute the instructions to display a model of a user and a virtual object in the virtual space, change at least one of the model and the virtual object to be displayed, and acquire user operation information. The processor changes at least one of an operation of the model in the virtual space or a display of the virtual object based on the user operation information and function information about the virtual object acquired from the memory. An information processing system including each of the above information processing apparatus also constitutes another aspect of the embodiment. An information processing method corresponding to each of the information processing apparatus also constitutes another aspect of the embodiment. A storage medium storing a program storing a program that causes a computer to execute the above information processing method also constitutes another aspect of the embodiment.

Further features of the disclosure will become apparent from the following description of embodiments with reference to the attached drawings.

BRIEF DESCRIPTION OF THE DRAWINGS

FIG. 3 illustrates an example of an information database in the first embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
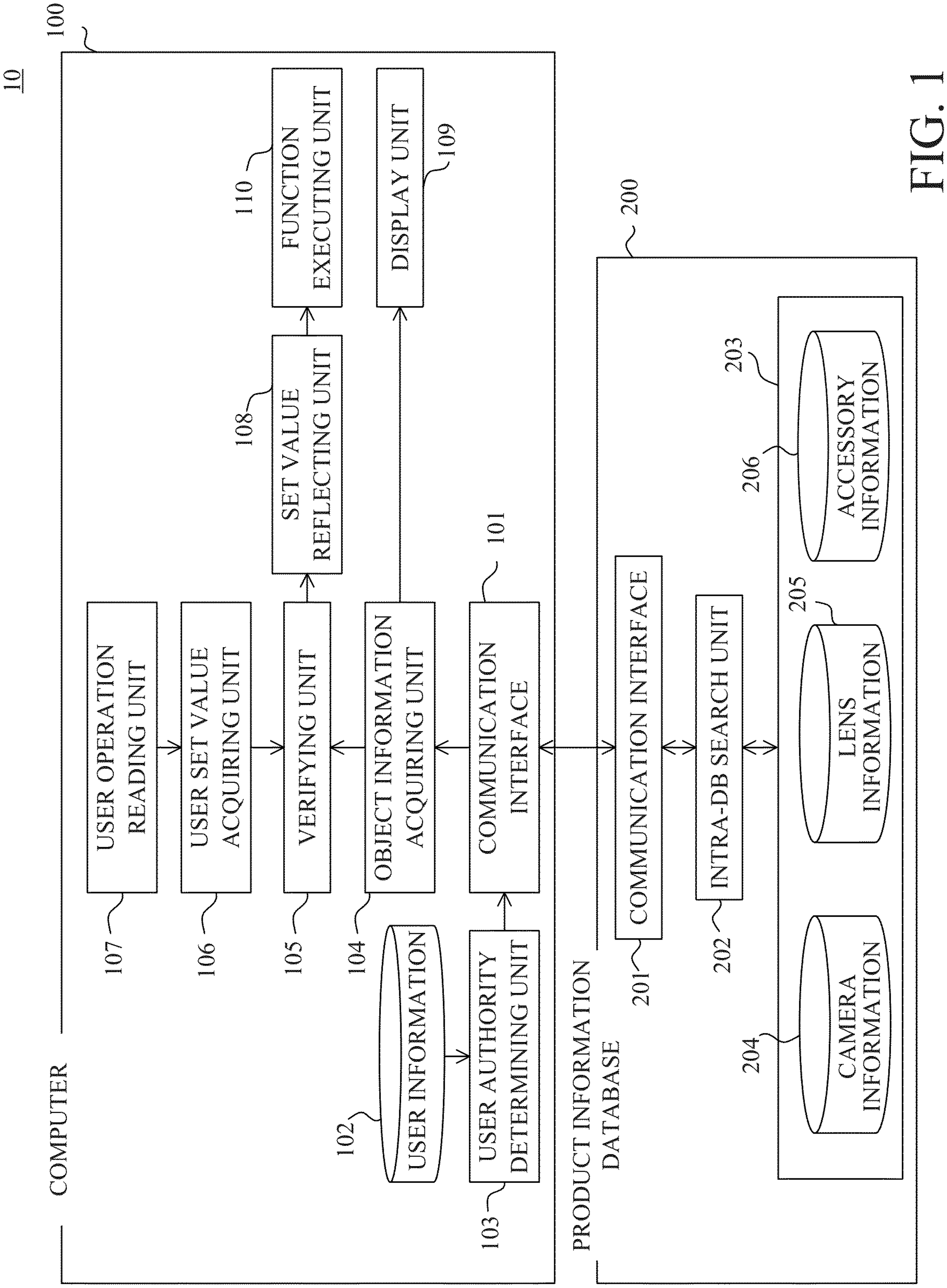
FIG. 1 is a block diagram of an information processing system according to a first embodiment.

Referring now to FIG. 1, a description will be given of a first embodiment. FIG. 1 is a block diagram of an information processing system 10. The information processing system 10 includes a computer (information processing apparatus) 100 and a product information database (information storing apparatus) 200. The computer 100 is, for example, an apparatus such as a head mount display (HMD) for displaying virtual space to a user. The computer 100 includes a communication interface 101, a user information storing unit (identification (ID) information storing unit (memory) for storing user ID information) 102, a user authority determining unit (second determining unit) 103, an object information acquiring unit 104, a verifying unit (first determining unit) 105, a user set value acquiring unit 106, a user operation reading unit (operation information acquiring unit for acquiring user information) 107, a set value reflecting unit 108, a display unit 109, and a function executing unit 110.

Figure 2:
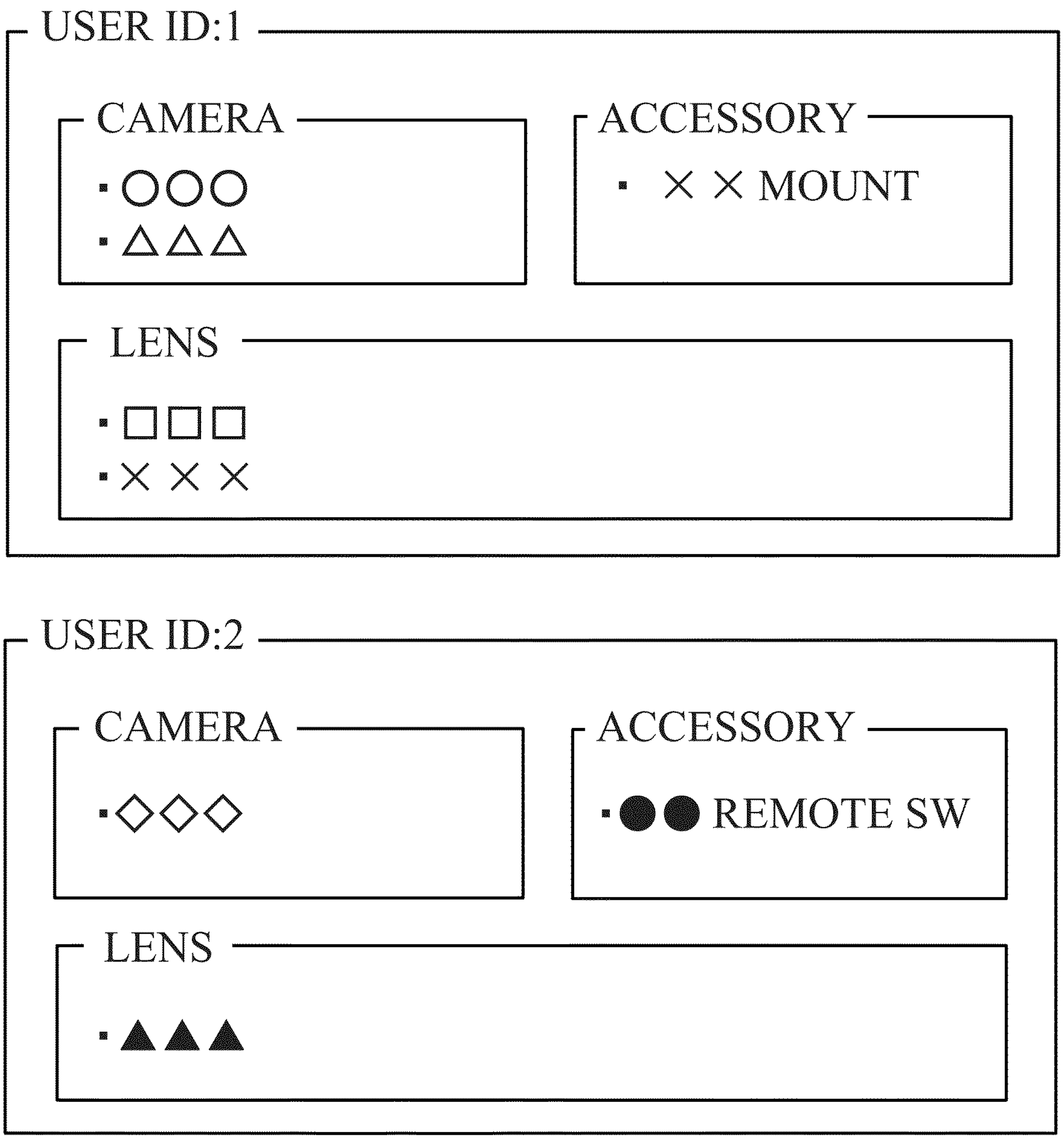
FIG. 2 illustrates an example of user information in the first embodiment.

In the computer 100, the user information storing unit 102 stores, for each user (user ID, user ID information), product name information that the user has the authority to execute in the virtual space and the actually selected product name information (user information). FIG. 2 is an example of the user information. As illustrated in FIG. 2, in a case where the product is an image pickup apparatus, the product name information includes information about the camera, lens, and accessory.

In a case where a user selects a product to execute its function in the virtual space, the user authority determining unit 103 determines whether the user has the authority to execute the function of the product. In other words, the user authority determining unit 103 determines whether the user corresponding to the user identification information is authorized (or entitled) to execute the function of the product (virtual object). In a case where it is determined that the user is authorized, the computer 100 transmits the product name information selected by the user to the product information database 200 via the communication interface 101. The product information database 200 receives the product name information via a communication interface 201. A intra-database (DB) search unit 202 searches for actual products based on the received product name information. In a case where actual product information matching the received product name information is found, the intra-DB search unit 202 retrieves the actual product information. That is, the product information database 200 has a search unit for searching for an actual product corresponding to the virtual object, and in a case where the search unit searches for the actual product corresponding to the virtual object, the product information database 200 transmits the function information about the actual product corresponding to the virtual object to the computer 100. In this embodiment, the product information group 203 in the product information database 200 includes, for example, a camera information database 204, a lens information database 205, and an accessory information database 206, but is not limited to this example.

FIG. 3 illustrates an example of the product information group 203 stored in the product information database 200. As illustrated in FIG. 3, the product information group 203 includes information about the size and appearance of each actual product and information about the function of each product. Information about the size and appearance includes information about the length and width of the product, the arrangement of various buttons, the position of a switch, the position of an LCD monitor, the type of a mount, etc. In the camera information database 204, the information about functions includes, for example, a recordable frame rate value, the number and speed of continuous imaging, an object detecting function, an autofocus (AF) frame display function, and the like. In the lens information database 205, information about functions includes, for example, information indicating whether the lens is a fixed focal length focus lens or a lens with a zoom function, information indicating whether the lens has a manual focus (MF) function only or further has an AF function, a focal length, a mount type, an angle of view, and the shortest imaging distance information, etc. In the accessory information database 206, information about functions includes, for example, an adapter function that enables connection between different mounts of the camera and lens, a remote imaging function that allows the avatar to capture an image with a remote camera, and the like. In the accessory information database 206, the information about the function may be information about a camera fixing function (tripod) that suppresses the shake of the camera body when the shutter is released.

The retrieved product information is sent to the object information acquiring unit 104 in the computer 100 via the communication interfaces 201 and 101. The display unit 109 displays an avatar (a user's model in the virtual space) and an object (a product (virtual object) in the virtual space) based on the product information received from the product information database 200.

On the other hand, the user set value acquiring unit 106 receives a menu value set by the user and user operation information perceived by the user operation reading unit 107. The verifying unit 105 determines whether or not the user operation is available based on the actual product specification, in conjunction with the already acquired product information. That is, the verifying unit 105 uses the user operation information and the function information to determine whether the user operation is executable. In a case where the verifying unit 105 determines that the user operation is available, the verifying unit 105 sends the user operation information to the set value reflecting unit 108. Then, the function executing unit 110 executes the function based on the information from the set value reflecting unit 108. In a case where the product is a camera, the functions include starting to take still images or videos, zooming the displayed image, and connecting the lens and camera. In a case where the verifying unit 105 determines that the function specified by the user operation is unavailable in light of the product specification, the verifying unit 105 grays out the function on the application menu or prevents the switching or ringing from operating. In a case where the verifying unit 105 determines that the combination of the camera and lens cannot be connected due to their mechanical configuration, it prevents them from being connected.

Figure 4:
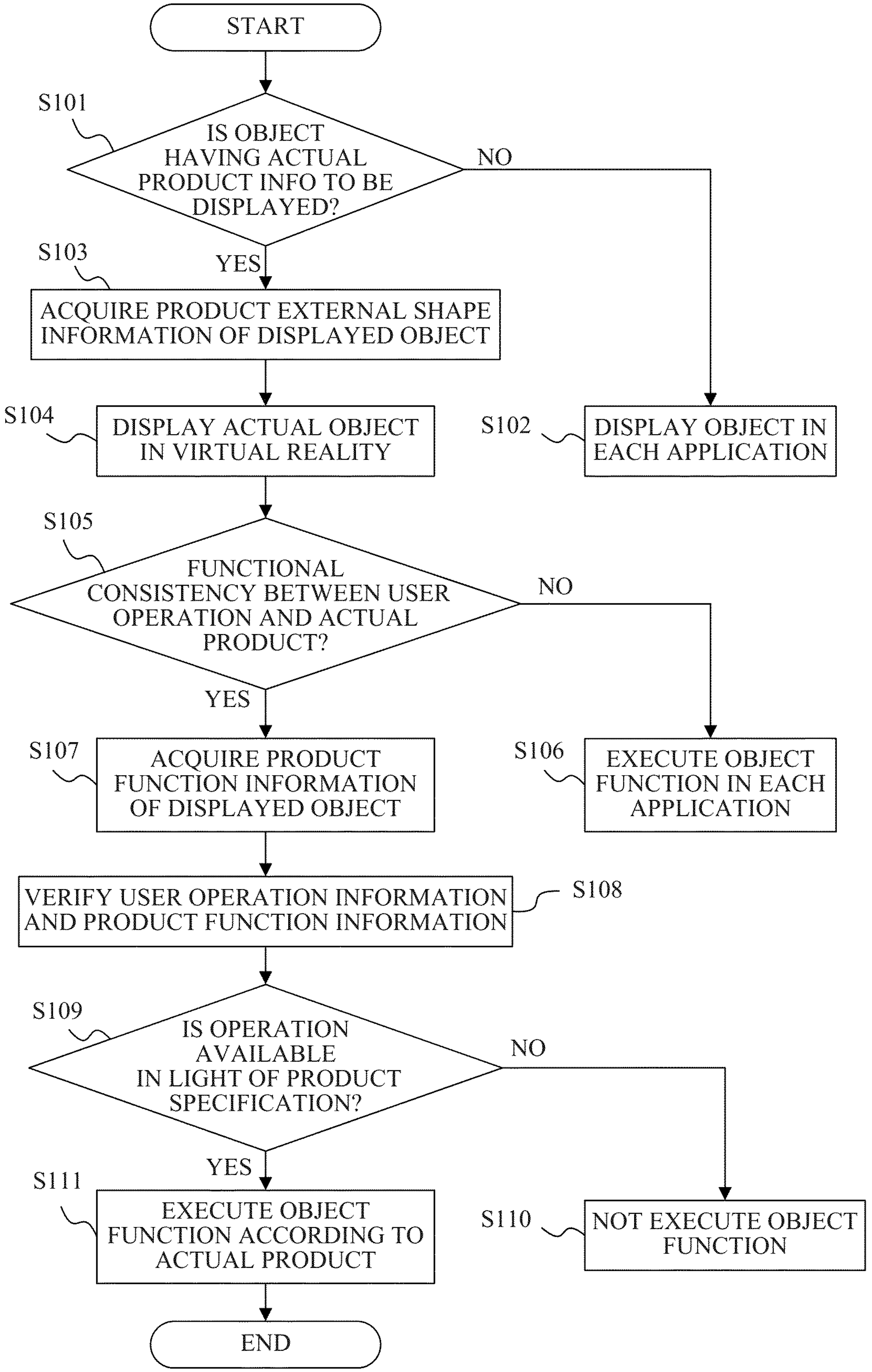
FIG. 4 is a flowchart illustrating the processing of an information processing apparatus according to the first embodiment.

Referring now to FIG. 4, a detailed description will be given of the processing of the computer 100. FIG. 4 is a flowchart illustrating the processing of the computer 100. Each step in FIG. 4 is mainly executed by each part of the computer 100 including the verifying unit 105.

First, in step S101, the verifying unit 105 determines whether or not the object (product) selected for display in the virtual reality application that is used by the user is included in the actual product information (whether or not the object having the actual product information is to be displayed). This determination is made based on information received from the product information database 200. In a case where it is determined that the object selected by the user is not included in the actual product information, the flow proceeds to step S102. In step S102, the display unit 109 displays a default object appearance in each virtual space application (displays an object in each application).

On the other hand, in a case where it is determined in step S101 that the object selected by the user is included in the actual product information, the flow proceeds to step S103. In step S103, the object information acquiring unit 104 acquires external shape data (product external shape information) such as the position, orientation, and size of the object from the product information database 200. Next, in step S104, the display unit 109 displays the actual product (actual or real object) in the virtual reality.

Next, in step S105, the verifying unit 105 determines whether or not the user reproduces the function of the actual object (actual or real product) in the virtual reality (whether or not to ensure functional consistency with the user operation (object displayed in S104)). In a case where it is determined that the function of the actual object is not to be reproduced (the functional consistency between the user operation and the actual object is not ensured), the flow proceeds to step S106. In step S106, the function executing unit 110 executes the function of the object determined within each application.

On the other hand, in a case where it is determined in step S105 that the function of the actual object is to be reproduced (functional consistency between the user operation and the actual object is ensured), the flow proceeds to step S107. In step S107, the object information acquiring unit 104 acquires function information (product function information about the displayed object) from the product information database 200. Next, in step S108, the verifying unit 105 verifies the user operation information separately acquired by the user operation reading unit 107 and the product function information acquired in step S107, and recognizes the content of the user operation information. The user operation information includes, for example, menu value change information, button or ring operations acquired from the user's hand movement, and the like.

Figure 5A:
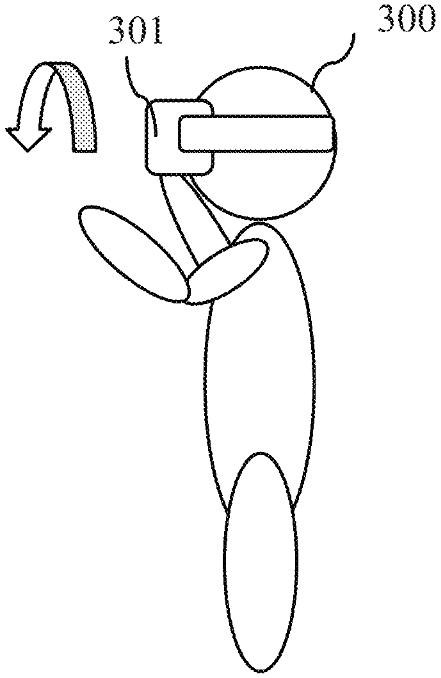
FIGS. 5A and 5B illustrate examples of user operations according to the first embodiment.
Figure 5B:
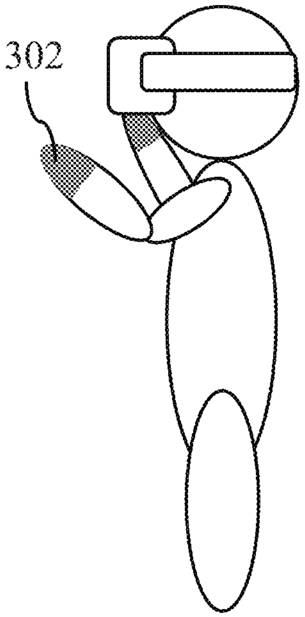

FIGS. 5A and 5B illustrate an example of user operation. In FIGS. 5A and 5B, reference numeral 300 denotes a user in the real world, reference numeral 301 denotes a head mount display (HMD) in the real world, and reference numeral 302 denotes a motion sensor (marker) in the real world. As illustrated in FIG. 5A, the hand movement of the user 300 can be captured as a see-through image from the HMD 301. The hand movement of the user 300 may be acquired from the movement of the motion sensor 302 worn on the hand as illustrated in FIG. 5B, or from a camera (not illustrated) separately installed in the room.

Next, in step S109, the verifying unit 105 determines whether the user operation is an operation that is unavailable according to the product specification of the object. In a case where it is determined that the user operation is unavailable according to the product specification of the object, the flow proceeds to step S110. In step S110, the function executing unit 110 does not execute the function of the object based on the user operation. At this time, the function executing unit 110 can execute a predetermined function (a function corresponding to the setting of the application, and all functions executable in the application).

On the other hand, in a case where it is determined in step S109 that the user operation is an operation that is available according to the product specification of the object, the flow proceeds to step S111. In step S111, the function executing unit 110 executes the object function (object operation corresponding to the actual product) based on the user operation. That is, the function executing unit 110 executes a function (function corresponding to function information) based on the function information about the virtual object (product function information) acquired from the product information database 200.

Figure 6:
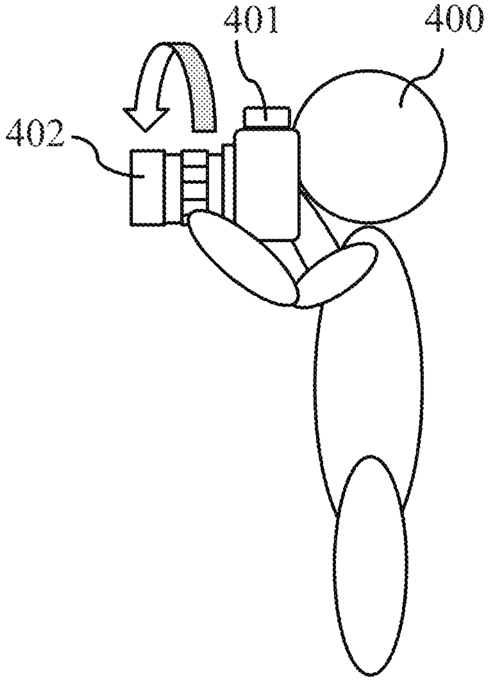
FIG. 6 explains avatar motion and object display in the first embodiment.

For example, assume that a user operates a zoom ring of a lens in the real world, as illustrated in FIG. 5A. FIG. 6 explains avatar motion and object display in a case where the user operates the zoom ring. In FIG. 6, reference numeral 400 denotes an avatar in the virtual space, reference numeral 401 denotes a camera within the virtual space, and reference numeral 402 denotes a lens with a zoom function within the virtual space. As the user operates the zoom ring in the real world, as illustrated in FIG. 6 and the selected lens in the virtual space is a zoom lens, an image being captured is enlarged. However, in a case where the lens configuration does not have the zoom function in light of the product specification, such as a fixed focal length focus lens (corresponding to step S110 in FIG. 4), even if the user's hand movement is reproduced as the avatar motion, an image being recorded or an image that the user is viewing is not enlarged.

For example, in a case where the lens selected by the user has an AF/MF switch, during AF, autofocusing is made on the user's desired position within a range of the lens performance and the currently selected menu value and the image blur increases as the position becomes more distant from the focal length. On the other hand, in a case where the MF button is selected or an MF dedicated lens is attached, the focus position is maintained constant and autofocusing is not made on the user's desired position. At that time, information such as a focal length, an F-number, and a pixel pitch, is also verified.

Assume blur reproduction. In capturing a still image in the virtual world, blurring does not occur as in reality, but in a case where the user selects to maintain functional consistency in step S105, the image is blurred by the user's camera shake or shutter pressing action. In a case where the lens or camera has an image stabilizing function and the user turns on this function, the camera shake is suppressed within the performance range.

In a case where a user performs slow-motion or fast-motion recording, a combination of image resolution and frame rate value installed in the actual camera is acquired and reflected in a recorded image. In a case where the frame rate of the virtual space application being executed is lower than the frame rate of the actual camera, a warning will be issued to that effect and the execution will be restricted.

This embodiment trains users according to the actual specification of the product being used in the virtual space.

Second Embodiment

Figure 7:
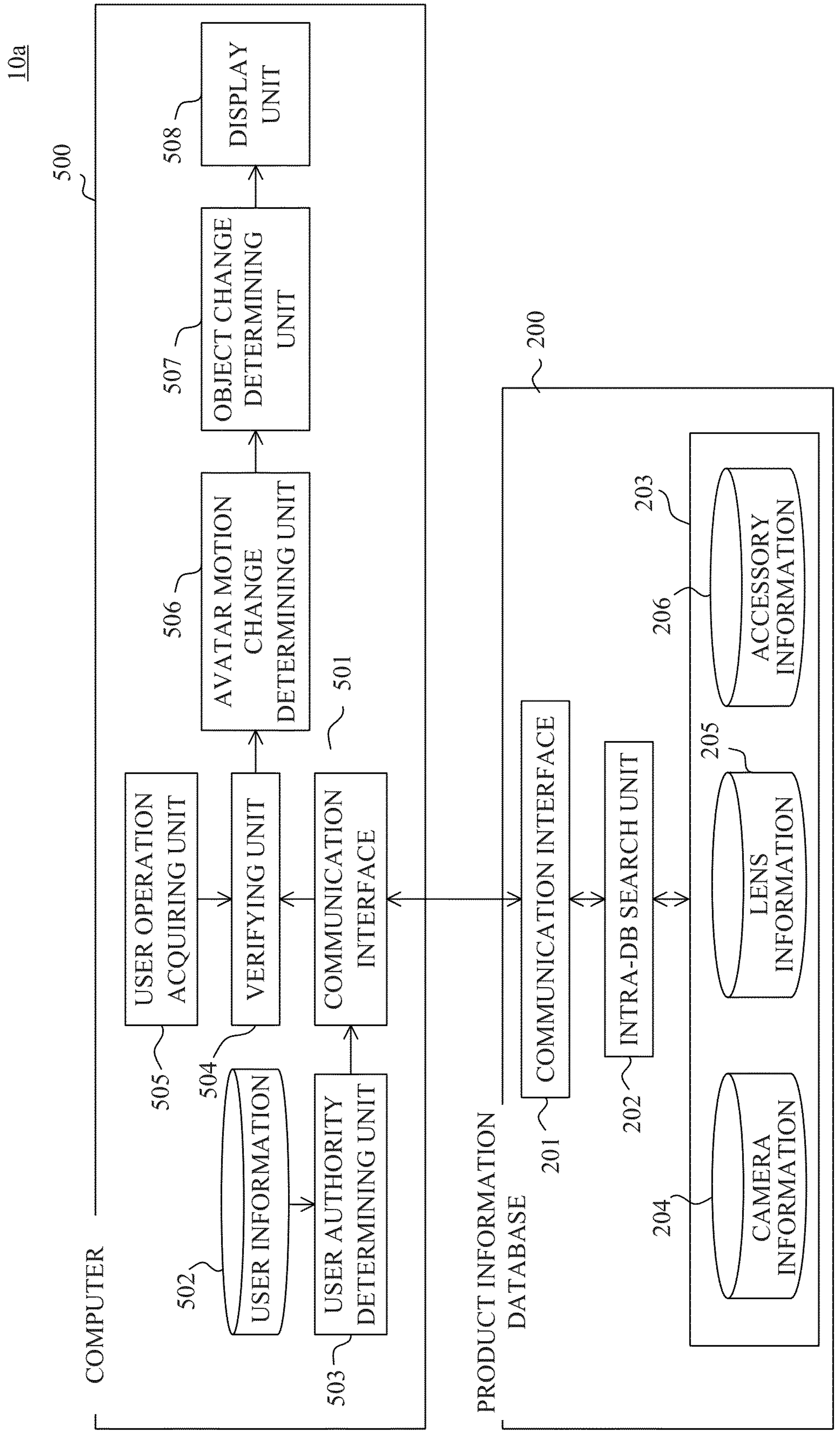
FIG. 7 is a block diagram of an information processing system according to a second embodiment.

A description will now be given of a second embodiment. FIG. 7 is a block diagram of the information processing system 10*a*. The information processing system 10*a* includes a computer (information processing apparatus) 500 and a product information database (information storing apparatus) 200. The computer 500 is, for example, an apparatus such as a HMD for displaying virtual space to a user. The computer 500 includes a communication interface 501, a user information storing unit (ID information storing unit (memory)) 502, a user authority availability determining unit (third determining unit) 503, and a verifying unit 504. The computer 500 also includes a user operation acquiring unit (operation information acquiring unit) 505, an avatar motion change determining unit 506, an object change determining unit 507, and a display unit 508. The user information storing unit 502 stores user ID information. The user authority determining unit 503 determines whether a user corresponding to the user ID information is authorized (entitled) to display an object (virtual object) on the display unit 508. The user operation acquiring unit 505 acquires user operation information. The avatar motion change determining unit 506 and the object change determining unit 507 are changing units that change at least one of the model or the virtual object displayed on the display unit 508. The changing unit changes at least one of the movement of the avatar (model) and the display of the object (virtual object) in the virtual space based on the user operation information and the function information about the object (virtual object) acquired from the product information database 200. The product information database 200 is similar to that of the first embodiment, and thus a description thereof will be omitted.

Figure 8:
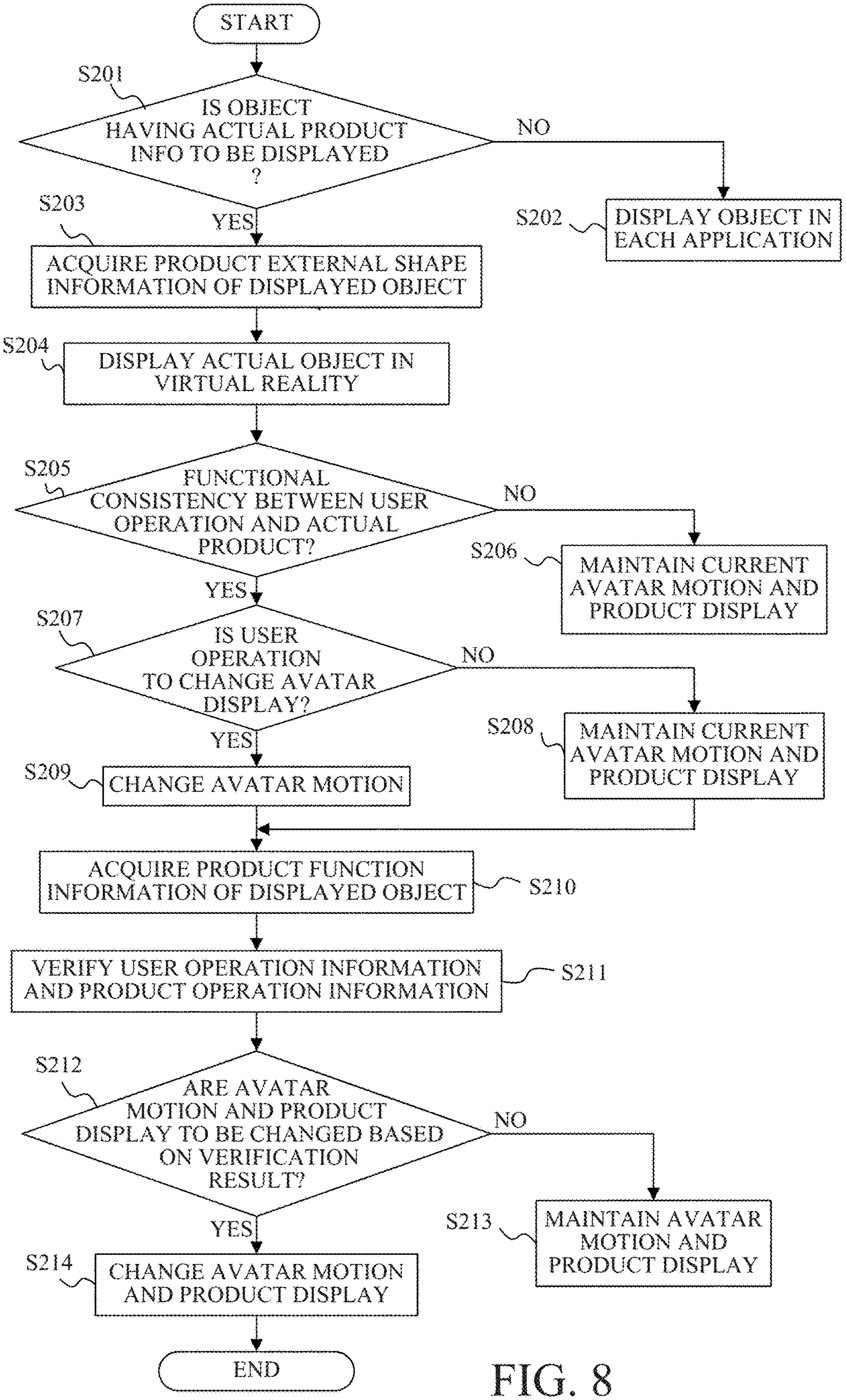
FIG. 8 is a flowchart illustrating the processing of an information processing apparatus according to the second embodiment.

Referring now to FIG. 8, a detailed description will be given of the processing of the computer 500. FIG. 8 is a flowchart illustrating the processing of computer 500. Each step in FIG. 8 is mainly executed by each part of the computer 500, such as the verifying unit 504. Steps S201 to S205 in FIG. 8 are similar to steps S101 to S105 in FIG. 4, respectively, and therefore a description thereof will be omitted.

In a case where it is determined in step S205 that the function of the actual object is not to be reproduced (functional consistency between the user operation (object displayed in step S204) and the actual object is not ensured), the flow proceeds to step S206. In step S206, the display unit 508 maintains (continues) displaying the currently displayed avatar motion and object appearance.

Figure 9:
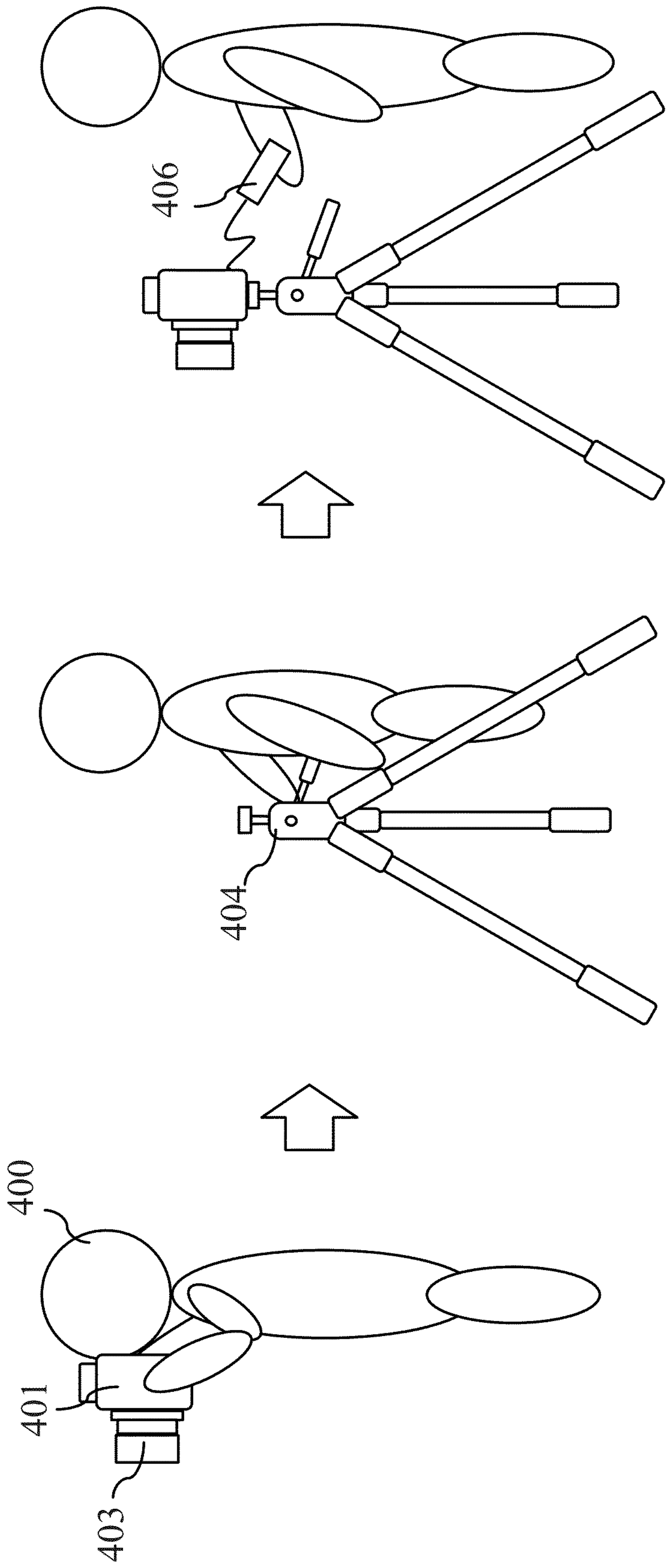
FIG. 9 explains avatar motion and object display in the second embodiment.

On the other hand, in a case where it is determined in step S205 that the function of the actual object is to be reproduced (functional consistency between the user operation and the actual object is ensured), the flow proceeds to step S207. In step S207, the avatar motion change determining unit 506 determines whether the user operation is an operation that is to change the avatar display. In a case where it is determined that the user operation is not an operation that is not to change the avatar display, the flow proceeds to step S208. In step S208, the display unit 508 maintains (continues) displaying the currently displayed avatar motion and object appearance. On the other hand, in a case where it is determined in step S207 that the user operation is an operation that is to change the avatar display, the flow proceeds to step S209. In step S209, the avatar motion change determining unit 506 changes the avatar motion For example, the camera is commonly mounted on a tripod to prevent image blur in performing slow shutter imaging in the real world. In the virtual world, if the avatar in the virtual space is holding a camera even though the user is trying to capture an image with a slow shutter, the avatar motion may be changed. FIG. 9 explains avatar motion and object display. In FIG. 9, reference numeral 400 denotes an avatar in the virtual space, reference numeral 401 denotes a camera in the virtual space, reference numeral 403 denotes a fixed focal length focus lens in the virtual space, reference numeral 404 denotes a tripod in the virtual space, and reference numeral 406 denotes a remote switch in the virtual space.

In this example, in step S209, as illustrated in FIG. 9, the avatar 400 takes out the tripod 404 and fixes the camera 401 onto it, and presses the remote switch 406 instead of the camera switch. On the other hand, in a case where the user operation corresponds to the actual operation, the operation of the avatar 400 is not changed and the avatar 400 continues the operation in step S208.

Next, in step S210, the verifying unit 504 acquires product function information about the displayed object from the product information database 200. Next, in step S211, the verifying unit 504 verifies the user operation information and the acquired product function information. Next, in step S212, the avatar motion change determining unit 506 and the object change determining unit 507 determine whether or not the avatar motion and object display (product display) are to be changed, respectively, based on the verification result of the verifying unit 504. In a case where it is determined that the avatar motion and object display (product display) are not to be changed, the flow proceeds to step S213. In step S213, the display unit 508 maintains (continues) the avatar motion and object display. On the other hand, in a case where it is determined that the avatar motion and object display (product display) are to be changed, the flow proceeds to step S214. In step S214, the display unit 508 changes the avatar motion and object display.

Figure 10A:
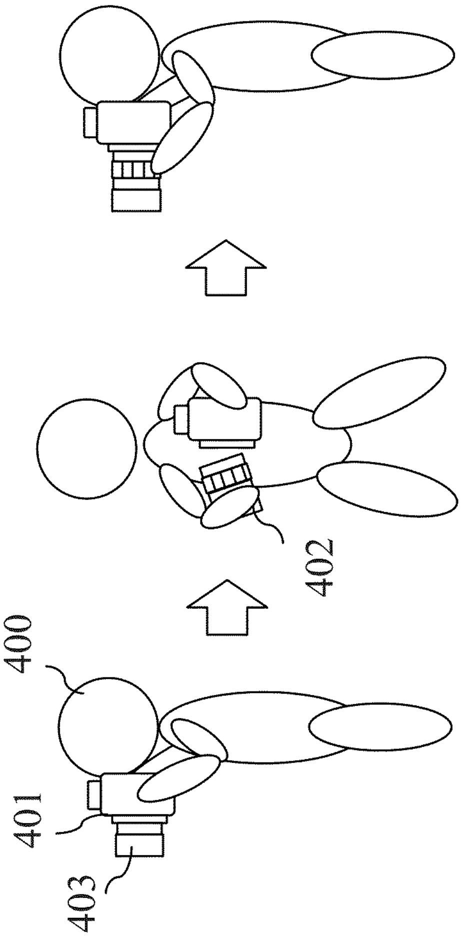
FIGS. 10A and 10B explain avatar motion and object display in the second embodiment.
Figure 10B:
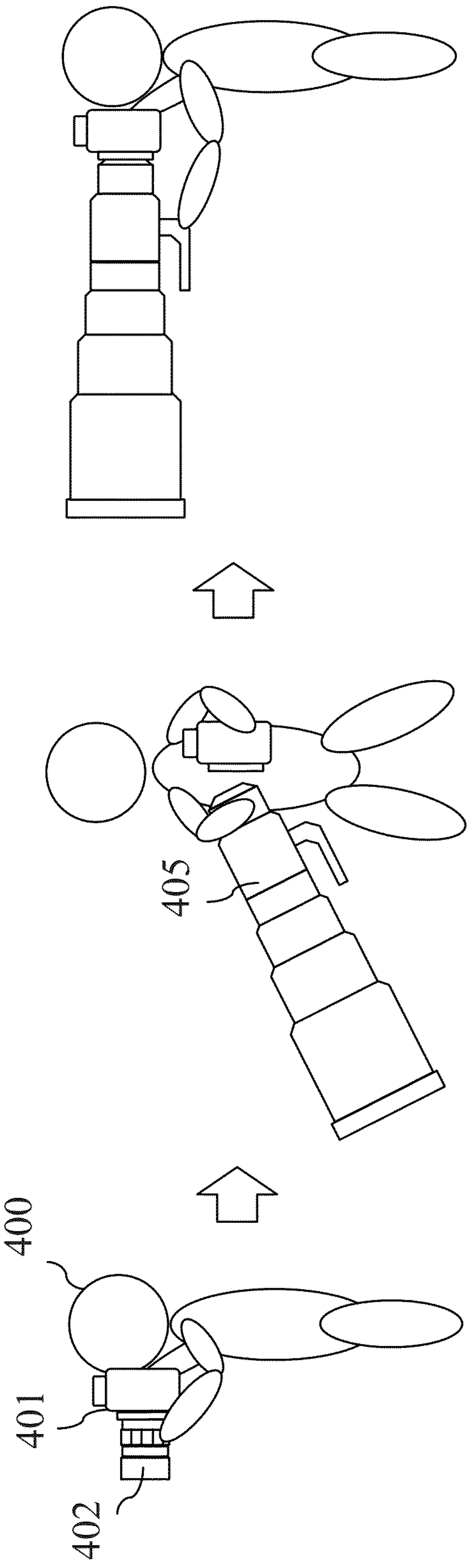

FIGS. 10A and 10B explain avatar motion and object display. In FIG. 10B, reference numeral 405 denotes a super-telephoto lens in the virtual space. For example, in a case where the user performs a zoom operation even though the lens of the camera 401 currently held by the avatar 400 is a fixed focal length focus lens 403, it is determined that the operation is to change the avatar motion. At this time, as illustrated in FIG. 10A, the avatar 400 adds an action of changing the lens from the fixed focal length focus lens 403 to the lens 402 with the zoom function. Alternatively, in a case where the avatar 400 has operated a super-telephoto point beyond the lens performance of the camera 401 currently held by the avatar 400, the action of replacing the zoom lens 402 with the zoom function with the super-telephoto lens 405, as illustrated in FIG. 10B.

In a case where there are a plurality of product candidates that can be selected in response to a user operation, it is necessary to select which product to replace with. At this time, the computer 500 may automatically select the product, or the user may select the product. In the case of the user selection, the priority of replacement products may be previously determined by the user instead of newly determining a replaced product for each user operation. In this case, the object change determining unit 507 changes the display of the virtual object (product) based on the priority previously registered by the user. Thereby, a series of user actions and avatar actions can be brought closer to real-world imaging actions, and the user's sense of immersion can be further enhanced.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an information processing apparatus that can realize a virtual space environment that enhances the user's sense of immersion.

This application claims the benefit of Japanese Patent Application No. 2022-200868, filed on Dec. 16, 2022, which is hereby incorporated by reference herein in its entirety.

What is claimed is:

1. An information processing apparatus for generating virtual space and a virtual object, the information processing apparatus comprising:

a memory storing instructions; and a processor configured to execute the instructions to:

display the virtual object in the virtual space, and execute a function of the virtual object in the virtual space based on user operation information indicating a user operation, and function information about the virtual object acquired from the memory, wherein the function information about the virtual object is function information about an actual product corresponding to the virtual object, and wherein the processor is configured to execute the function corresponding to the function information in a case where it is determined, using the user operation information and the function information, that a user operation is executable according to a product specification of the actual product, and wherein the instructions when executed, further cause the information processing apparatus to:

execute (i) the function corresponding to the function information in a case where the user operation is executable according to the product specification of the actual product, and execute (ii) a function corresponding to a setting of an application in a case where the user operation is not executable according to the product specification of the actual product.

2. The information processing apparatus according to claim 1, wherein the processor is configured to execute a predetermined function that is different from the function corresponding to the function information in a case where it is determined that the user operation is not executable according to the product specification of the actual product.

3. The information processing apparatus according to claim 1, wherein the processor is configured to:

acquire the user operation information, determine whether the user operation is executable using the user operation information and the function information, and execute the function in a case where it is determined that the user operation is executable.

4. The information processing apparatus according to claim 1, wherein the memory further stores user identification information, and wherein the instructions when executed, further cause the information processing apparatus to:

determine whether a user corresponding to the user identification information is authorized to execute the function of the virtual object, and wherein execution of the function corresponding to the function information is permitted only in a case where it is determined that the user is authorized to execute the function of the virtual object.

5. An information processing system comprising:

an information storing apparatus configured to store function information about a plurality of actual products; and the information processing apparatus according to claim 1, wherein the information storing apparatus includes a processor and a memory, including instructions stored thereon, which when executed cause the information storing apparatus to:

transmit, to the information processing apparatus, function information about one of the plurality of actual products, which corresponds to the virtual object.

6. The information processing system according to claim 5, wherein the instructions when executed, further cause the information storing apparatus to:

search for the actual product corresponding to the virtual object, and wherein in a case where the information storing apparatus searches for the actual product corresponding to the virtual object, the information storing apparatus transmits the function information about the actual product corresponding to the virtual object, to the information processing apparatus.

7. An information processing method for generating virtual space and a virtual object, the information processing method comprising the steps of:

displaying the virtual object in the virtual space; and executing a function of the virtual object in the virtual space based on user operation information indicating a user operation, and function information about the virtual object acquired from a memory, wherein the function information about the virtual object is function information about an actual product corresponding to the virtual object, and wherein the executing step executes the function corresponding to the function information in a case where it is determined, using the user operation information and the function information, that the user operation is executable according to a product specification of the actual product, and wherein the executing step includes:

executing (i) the function corresponding to the function information in a case where the user operation is executable according to the product specification of the actual product, and executing (ii) a function corresponding to a setting of an application in a case where the user operation is not executable according to the product specification of the actual product.

8. An information processing method for generating virtual space, the information processing method comprising the steps of:

displaying a model of a user and a virtual object in the virtual space;

changing at least one of the model and the virtual object to be displayed; and acquiring user operation information indicating a user operation, wherein the changing step changes at least one of an operation of the model in the virtual space or a display of the virtual object based on the user operation information and function information about the virtual object acquired from a memory, wherein the function information about the virtual object is function information about an actual product corresponding to the virtual object, and wherein the changing step changes at least one of the operation of the model or the display of the virtual object in a case where it is determined, using the user operation information and the function information, that the user operation does not correspond to an actual operation of the actual product, and wherein the executing step includes:

executing (i) the function corresponding to the function information in a case where the user operation is executable according to the product specification of the actual product, and executing (ii) a function corresponding to a setting of an application in a case where the user operation is not executable according to the product specification of the actual product.

9. A non-transitory computer-readable storage medium storing a program that causes a computer to execute the information processing method according to claim 7.

* * * * *